United States Patent [19]

Frentzel et al.

[11] Patent Number: 4,460,738
[45] Date of Patent: Jul. 17, 1984

[54] PREPARATION OF CARBOXYLIC ACID-CONTAINING POLYURETHANE PREPOLYMERS AND AQUEOUS DISPERSIONS THEREOF

[75] Inventors: Richard L. Frentzel, Guilford; Louis Rua, Jr., Woodbridge; Anne L. Pacheco, Uncasville, all of Conn.

[73] Assignee: Olin Corporation, New Haven, Conn.

[21] Appl. No.: 475,786

[22] Filed: Mar. 16, 1983

[51] Int. Cl.³ .................................................. C08G 18/34
[52] U.S. Cl. ........................................ 524/591; 528/76; 528/77
[58] Field of Search ...................... 524/591; 528/76, 77

[56] References Cited

U.S. PATENT DOCUMENTS

| | | | |
|---|---|---|---|
| 3,419,510 | 12/1968 | Hudak | 260/18 |
| 3,983,058 | 9/1976 | Hirooka et al. | 260/29 |
| 4,124,552 | 11/1978 | Koleske et al. | 260/29 |
| 4,207,227 | 6/1980 | von Bonin | 260/40 |
| 4,250,077 | 2/1981 | von Bonin et al. | 260/37 |
| 4,263,413 | 4/1981 | Gardner et al. | 525/34 |
| 4,365,024 | 12/1982 | Frentzel | 521/114 |

OTHER PUBLICATIONS

*Functional Monomers Their Preparation, Polymerization and Application,* vol. 2, by Ronald H. Yocum and Edwin B. Nyquist, Marchel Dekker, Inc., New York 1974.
D. Dieterich; *Polyurethane Ionomers, A New Class of Block Polymers,* Angew. Chem. Internat. Edit., vol. 9 (1970), No. 1, pp. 40–50.
V. Malatesta and J. C. Scaiano, *Absolute Rate Constants for the Reactions of tert-Butoxyl with Ethers: Importance of the Stereoelectronic Effect,* J. Org. Chem., 1982, 47, pp. 1455–1459, Literature Search (NHTIS 82-215) carried out by Olin Corporation.

*Primary Examiner*—Maurice J. Welsh
*Attorney, Agent, or Firm*—William A. Simons; Thomas P. O'Day

[57] ABSTRACT

Disclosed is a process for making carboxylic acid-containing mono- and polyether polyol addition products by reacting maleic acid, fumaric acid, itaconic acid, or mixtures thereof with at least one polyhydroxy-containing mono- or polyether compound (e.g. a polyether diol or triol) in the presence of a peroxy-type free radical initiator. Also disclosed are the processes of making polyurethane prepolymers and aqueous polyurethane dispersions from these carboxylic acid-containing mono- and polyether polyol addition products and processes for using these dispersions in coatings, adhesives and other useful products.

17 Claims, No Drawings

PREPARATION OF CARBOXYLIC ACID-CONTAINING POLYURETHANE PREPOLYMERS AND AQUEOUS DISPERSIONS THEREOF

BACKGROUND OF THE INVENTION

1. Field Of The Invention

The present invention relates to a process for making selected carboxylic acid-containing monoether and polyether polyol addition products. The present invention also relates to these addition products as compositions-of-matter. The present invention further relates to polyurethane prepolymers and aqueous polyurethane dispersions made from these addition products, along with the processes for making these latter products. Still further, the present invention relates to the processes for using these aqueous polyurethane dispersions as coatings, adhesives, and other useful products.

2. Description of the Prior Art

Reactions of carboxylic acids with polyols are well known. The best known reaction between these compounds is the formation of polyester polyols wherein the acid groups react with the OH groups in the polyol.

Other reactions have also been taught. U.S. Pat. No. 4,250,077 (von Bonin et al.) teaches mixing olefinically unsaturated carboxylic acids with many types of polyols and then polymerizing the mixture with a free-radical former to produce a graft polymer. The preferred carboxylic acid (and the only acid used in the working examples) is acrylic acid, which homopolymerizes with itself. It should be noted that his reference does not teach the exact mechanism by which this "polymerization" reaction is carried out.

U.S. Pat. No. 4,365,024 (Frentzel) teaches making surfactants suitable for incorporation in polyurethane foams by reacting under free radical polymerization conditions a polyoxyalkylene adduct and an esterified unsaturated dibasic acid containing 4 or 5 carbon atoms. The mechanism of this reaction is referred to as grafting, i.e. the reaction product is composed of the polyoxyalkylene adduct backbone to which are attached at intervals "grafts" of the unsaturated diester. See column 4, lines 46-51 of this patent. The patent further states that "In light of the known inability of unsaturated diesters of the invention to homopolymerize, it is believed that the mechanism of the reaction may involve the addition of single diester units to the polyoxyalkylene backbone". The patent specifically teaches that these surfactants may be used in phenolic resin foams, polyisocyanurate foams and polyurethane foams.

Until the present invention, no one has proposed the free-radical addition of single carboxylic acid units at intervals onto the backbone of an oxyalkylene adduct (i.e. not at the —OH terminals as in polyester formation). It was quite surprising to find that selected carboxylic acids will react with polyhydroxy-containing monoether or polyether compounds in the presence of selected free radical initiators to attach single acid units at intervals onto the backbone of these ether-containing compounds. However, it should be noted that not all carboxylic acids or free radical initiators may be used for this reaction; only those defined below. Furthermore, it was found that these selected carboxylic acid-containing mono- and polyether products have a particularly advantageous suitability for making aqueous polyurethane dispersions. The single acid units on the backbone provide adequate sites for reaction with a neutralization agent to make a stable aqueous dispersion from the product, yet are short enough so that the viscosity of the product is not undesirably high.

BRIEF SUMMARY OF THE INVENTION

Accordingly, the present invention is directed to a process for making carboxylic acid-containing polyurethane prepolymers and aqueous polyurethane dispersions comprising:

(a) reacting an ethylenically unsaturated dicarboxylic acid selected from the group consisting of maleic acid, fumaric acid, itaconic acid, and mixtures thereof with at least one polyhydroxy-containing mono- or polyether compound in the presence of a peroxy-type free radical catalyst; said weight ratio of said polyhydroxy-containing mono- or polyether compound to said acid being from about 99:1 to about 70:30.

(b) reacting at least one of these carboxylic acid-containing monoether or polyether polyol addition products with a polyisocyanate to form a polyurethane prepolymer; and (c) dispersing this prepolymer in an aqueous solution to form an aqueous polyurethane dispersion.

Furthermore, these aqueous polyurethane dispersions may be used as coatings, adhesives and other useful products.

Still further, the present invention is directed to the above-noted carboxylic acid-containing polyurethane prepolymers and aqueous polyurethane dispersions as novel compositions-of-matter.

DETAILED DESCRIPTION

1. Preparation of Carboxylic Acid-Containing Monoether or Polyether Polyol Addition Products While the present invention is not to be so limited, this free radical initiated addition reaction is believed to occur by a three-step mechanism, which is illustrated by the following Equations (I) through (X) wherein the monoether polyol or polyether polyol employed is represented by A; one of the selected acids is represented by B; and the peroxy-type free radical initiator is represented by ROOR:

Initation:

$$ROOR \rightarrow 2RO\cdot \qquad (I)$$

Propagation:

$$A + RO\cdot \rightarrow A\cdot + ROH \qquad (II)$$

$$A\cdot + B \rightarrow A - B\cdot \qquad (III)$$

$$A - B\cdot + A \rightarrow A - B + A\cdot \qquad (IV)$$

$$A - B\cdot + ROOR \rightarrow A - B - OR + RO\cdot \qquad (V)$$

$$A - B\cdot + ROH \rightarrow A - B + RO\cdot \qquad (VI)$$

Termination:

$$2RO\cdot \rightarrow ROOR \qquad (VII)$$

$$A\cdot + A \rightarrow A - A \qquad (VIII)$$

$$AB\cdot + A \rightarrow A - B - A \qquad (IX)$$

$$AB\cdot + AB \rightarrow ABBA \qquad (X)$$

In the case where tripropyleneglycol (TPG) is the polyether polyol(A) employed and either maleic acid [cis-HOOCCH=CHCOOH] or fumaric acid [trans-HOOCCH=CHCOOH] are employed as the acid(B), Equations (II), (III) and (IV) would be written respectively as the equations (IIa), (IIIa) and (IVa) as shown below:

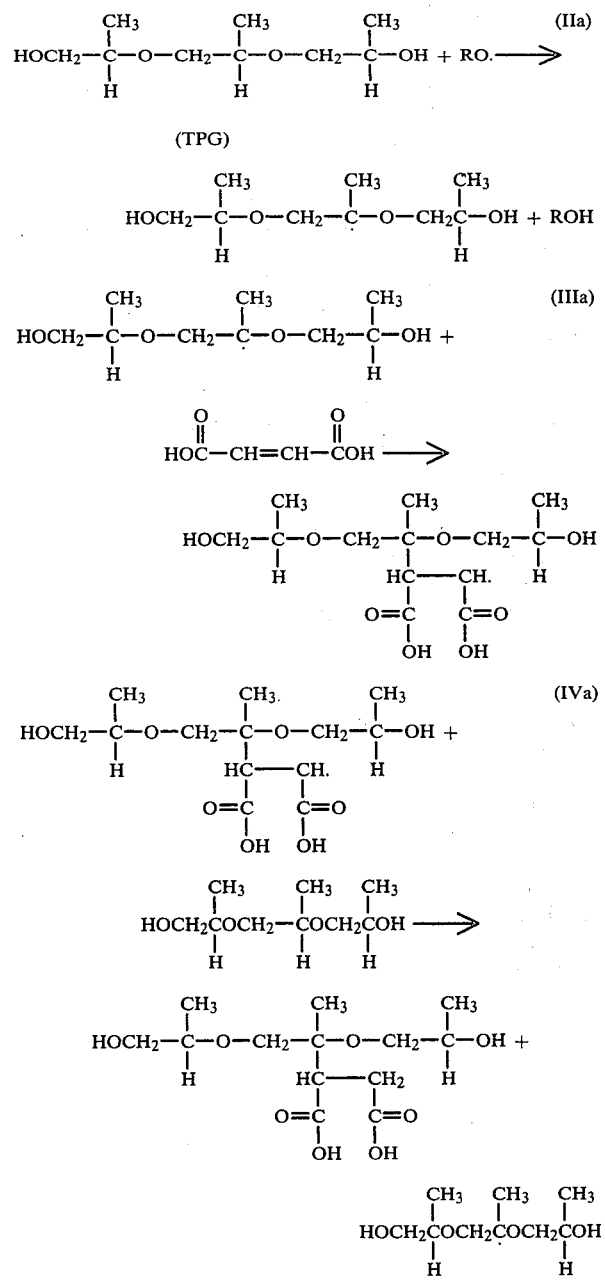

As can be seen in Equation (IIIa), above, the carboxylic acid replaces a hydrogen atom on a carbon adjacent to an oxygen atom in an ehter linkage (C—O—C). With TPG as the polyether polyol, there are three other sites where it is believed the acid groups may replace a hydrogen. These are the other three carbons adjacent to an ether-oxygen atom. Thus it is possible in theory that individual carboxylic acid groups may attached to all four sites on TPG. In practice, it is believed that steric effects will prevent the attachment of that many acid groups on such a short polyether polyol. On much longer polyether polyols, it may be possible that many carboxylic acid groups will become attached.

Maleic acid, fumaric acid and itaconic acid [HOOCCH$_2$C(=CH$_2$)COOH] are the only known ethylenically unsaturated dicarboxylic acids that could be used for this invention because they do not homopolymerize. Free radical addition reactions with them are completed by removal of a hydrogen from another polyol [see Equation (IV) above] or from another hydrogen atom source. Maleic acid and fumaric acid or mixtures of the two are preferred because of cost considerations.

Suitable polyhydroxy-containing monoether and polyether compounds for the present invention include any compound which contains 2 or more hydroxyl groups and contains 1 or more ether linkages (C—O—C) and having a molecular weight from 106 to about 20,000. The compounds are commonly called either monoether polyols or polyether polyols. The two or more hydroxyl groups are needed for reaction with polyisocyanates to form polyurethane prepolymers. The ether linkage is needed for the formation of a free radical on an adjacent carbon. See V. Malatesta and J.C. Scaiano, "Absolute Rate Constants for the Reactions of tert-Butoxyl with Ethers: Importance of the Stereoelectronic Effect" *J. Org. Chem.*, 1982, 47, pages 1455-1459. Polyester polyols and other types of polyols which do not contain ether linkages could not be used for this reaction; but could be employed as supplemental polyols for reaction with polyisocyanates and the like.

In particular, suitable monoether polyols include diethylene glycol and dipropylene glycol. Because of their relatively short length, monoether polyols are usually not used alone, but used in combination with polyether polyols.

Suitable polyether polyols include various polyoxyalkylene polyols having from 2 to 8 hydroxyl groups and mixtures thereof. These can be prepared, according to well-known methods, by condensing an alkylene oxide, or a mixture of alkylene oxides using random or stepwise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide, tetrahydrofuran, epichlorohydrin and the like. The most preferred alkylene oxides are ethylene oxide, propylene oxide or a mixture of these two oxides using random or step-wise oxyalkylation.

The polyhydric initiator used in preparing the polyether polyol reactant includes the following and mixtures thereof (a) the aliphatic diols such as ethylene glycol, 1,3-propylene glycol, 1,2-propylene glycol, butylene glycols, butane diols, pentane diols, and the like; (b) the aliphatic triols such as glycerol, trimethylolpropane, triethylolpropane, trimethylolhexane, and the like; (c) higher functionality alcohols such as sorbitol, pentaerythritol, methyl glucoside, and the like; (d) the polyamines such as tetraethylene diamine; and (e) the alkanolamines such as diethanolamine, triethanolamine, and the like.

A preferred group of polyhydric initiators for use in preparing the polyether polyol reactant is one which comprises aliphatic diols and triols such as ethylene glycol, propylene glycol, glycerol, trimethylolpropane, and the like.

The alkylene oxide-polyhydric initiator condensation reaction is preferably carried out in the presence of a catalyst such as KOH as is well known in the art. In effecting the reaction, a sufficient proportion of alkylene oxide is preferably used as to provide a final polyol product having an average molecular weight of about 200 to about 10,000, and more preferably about 300 to about 6,500. The catalyst is thereafter preferably removed, leaving a polyether polyol which is ready for use in preparing the hydroxyl-terminated prepolymer of the invention.

The preferred polyether polyols are derived from diols, triols, and mixtures thereof. The most preferred polyether polyols for the present invention are polyoxyethylene diols and triols, polyoxypropylene diols and triols, block and random polyoxyethylenepolyoxypropylene diols and triols and mixtures thereof, having a molecular weight from about 300 to about 6500.

It should be noted that the monoether and polyether polyol reactants of the present invention may be reacted with diacids or anhydrides to form polyester polyether polyols prior to the reaction of this invention. Thus, polyester polyether polyols would be formed having carboxylic acid groups individually spaced on the molecule.

Any peroxy-type free radical initiator may be employed for this reaction. Other types of initiators are not suitable for this reaction. Typical peroxy-type free radical initiators include hydrogen peroxide and organo peroxides and hydroperoxides such as dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, dialphacumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, 2,5-di-methyl-2,5-bis(2-ethyl hexanoyl peroxy)hexane, 1,1-bis(t-butyl-peroxy) cyclohexane and t-butyl perbenzoate.

As stated above, the weight ratio of the total monoether polyol(s) and polyether polyol(s) employed to the unsaturated dicarboxylic acid should be from about 99:1 to about 70:30. When less than about 1 part by weight of the acid is used per about 99 parts of the polyol, the character of the polyol is hardly changed and this reaction is meaningless for most applications. When more than about 30 parts by weight of the acid is employed per about 70 parts of the polyol, there is a good chance that a significant portion of the acid will not react onto the polyol because of absence of sufficient reactive sites. Preferably, this weight ratio is from about 95:5 to about 80:20.

Besides the selected reactants, peroxy-type initiators and weight ratios mentioned above, the other reaction conditions of this step are not critical to the present invention and the present process should not be limited to any particular conditions. It is preferred to carry out this reaction at a temperature from about 25° C. to about 150° C. More preferably, the reaction temperature may be in the range from about 80° C. to about 130° C. The reaction temperature should be high enough to activate the peroxy-type free radical initiator for this reaction. In some cases, it may be desirable to add a free radical accelerator such as a Redox catalyst to speed up the reaction. The reaction time will depend mainly upon the reaction temperature used and suitable reaction times will range from about 30 minutes to 600 minutes. The reaction may be monitored by following the disappearance of the maleic, fumaric or itaconic acid in the reaction mixture with conventional analysis techniques.

Generally, this reaction may be carried out without a solvent. However, in some cases, it may be desirable to employ a solvent. For example, if a very viscous polyether polyol is employed, it may be desirable to thin the reaction mixture with water or another solvent to facilitate the reaction.

Furthermore, super- or sub-atmospheric reaction pressure is not necessary for the present reaction. Atmospheric pressure is preferred in order to avoid the expense of special reaction vessels.

The free-radical initiated reaction of this invention may be conducted under conditions known to be suitable for free-radical polymerizations. The reaction is advantageously carried out by mixing the reactants, initiator(s), and optionally with a free-radical accelerator(s) and solvent, at temperatures from about 25° C. to about 150° C. with an inert atmosphere (e.g. under a nitrogen blanket) until the reaction is complete. The initiator(s) and optional catalyst(s) and solvent may be added at the beginning of the reaction or may be added portionwise at intervals during the course of reaction. Likewise, the unsaturated acid reactant(s) and the monoether polyol(s) or polyether polyol(s) reactants may be brought together at the beginning of the reaction or may be combined in increments as the reaction proceeds.

The adducts produced by this reaction are generally water-insoluble, but they may be converted into water-dispersible form by reaction with a conventional neutralization agent (e.g. an inorganic or organic base) which converts some or all of the carboxylic acid groups into ionic groups according to well known methods.

2. Preparation of Polyurethane Prepolymers

The carboxylic acid-containing monoether and polyether polyol addition products prepared above may be used to form polyurethane prepolymer products. These prepolymers may be made by reacting these monoether or polyether polyols with an organic polyisocyanate under conventionally known reaction conditions.

Suitable organic polyisocyanates may be any aromatic, cycloaliphatic and aliphatic diisocyanates and higher polyisocyanates. Diisocyanates are the preferred class of polyisocyanates. Suitable aliphatic diisocyanates include hexamethylene diisocyanate; 4,4'-dicyclohexylmethane diisocyanate; 1,4-tetramethylene diisocyanate; and 1,10-decamethylene diisocyanate. Suitable aromatic diisocyanates include toluene-2,4- or 2,6-diisocyanate; 1,5-naphthalene diisocyanate; 4-methoxy-1,3-phenylene diisocyanate; 4-chloro-1,3-phenylene diisocyanate; 2,4'-diisocyanatodiphenyl ether; 5,6-dimethyl-1,3-phenylene diisocyanate; 2,4-dimethyl-1,3-phenylene diisocyanate; 4,4'-diisocyanatodiphenylether; benzidine diisocyanate; 4,4'-diisocyanatodibenzyl; methylene-bis(4-phenyl-isocyanate); and 1,3-phenylene diisocyanate.

Besides the presence of these two reactants, the other reaction parameters for this polyurethane-forming step are not critical and the present invention should not be limited to any particular conditions for carrying out this step.

It is preferable to carry out this step in the presence of a water miscible solvent which does not contain active hydrogens, especially if aqueous dispersions of the prepolymers are to be made. Examples include methyl ethyl ketone and N-methylpyrolidone.

Other conventional additives such as hardeners, emulsifiers, dyes, leveling agents and the like may be added. Suitable external emulsifiers include both ionic emulsifiers such as alkali and ammonium salts of long-chain fatty acids or long-chain aryl(alkyl)sulfonic acids and non-ionic emulsifiers such as ethoxylated alkyl benzenes having an average molecular weight of from about 500 to 10,000 as long as they are inert to the reactants and product of step (1) of this invention.

The ratio of isocyanate (NCO) groups to hydroxy (OH) groups in the reactants is preferably in the range from about 0.5:1 to about 5:1; more preferably, in the range from about 1.1:1 to 2:1.

The preferred reaction temperature for making the prepolymer is from about 25° C. to about 150° C., more preferably in the range from about 25° C. to about 100° C.

Since the reaction between NCO and the carboxylic acid group does occur and it appears to be slower than the NCO-hydroxyl reaction, the conditions can be varied in order to obtain either a maximum or minimum amount of crosslinking via amide formation. In actuality, all of the prepolymers contain some crosslinking via the reaction of COOH with NCO to form amide.

In this polyurethane prepolymer-forming step, it may be advantageous to add additional compounds which will also react with the isocyanate groups. These additional compounds may include polyether polyols, polyester polyols, and other conventional compounds known to react with polyisocyanates to form polyurethanes.

3. Preparation of Aqueous Polyurethane Dispersions

The polyurethane prepolymers prepared above may be easily made into aqueous polyurethane dispersions. This may be accomplished by simultaneously, (i) neutralizing the carboxylic acid groups in the prepolymer, if not done already, with a neutralizing agent; and (ii) dispersing the prepolymer in an aqueous solution. In a preferred embodiment, the prepolymer is also extended with water and/or at least one chain extender selected from the group consisting of a diamine having at least one active hydrogen per nitrogen atom, a diol, or mixtures thereof Any conventional neutralizing agent may be employed. Preferred agents include water soluble tertiary amines, alkali metal hydroxides and mixtures thereof. The preferred neutralizing agent is triethylamine. Also a possible stronger neutralizing agent may be used, such as sodium or potassium hydroxide.

The amount of neutralizing agent added is preferably sufficient to neutralize substantially all of the carboxylic acid groups in the prepolymer. This amount may be determined by measuring the actual acid number in the polyol or the prepolymer.

The amount of water added will depend upon the application which the dispersion will be used for. Generally, the amount of water required for most applications is such that the final dispersion will contain from about 20% to about 80% by weight solids.

It is preferred to combine the neutralizing agent with the prepolymer simultaneously with said dispersing step. Alternatively, it may be advisable in certain situations to neutralize the carboxylic acid groups before making the prepolymer or during or after the making of the prepolymer and before the addition of the prepolymer to the aqueous solution.

The chain-extending may be carried out by merely allowing the prepolymer to remain in the aqueous solution for a suitable period of time. However, for many applications, it is preferable to add additional chain extenders. Preferable chain extenders include any compound having two active hydrogen-containing groups and a molecular weight between 18 and 200. Specific examples include diols, diamines, hydrazines, dihydrazides and the like. The preferred diamine is ethylene diamine. Other suitable compounds include isophorone diamine, ethylene glycol, diethylene glycol, and 1,4-butanediol.

Besides the addition of neutralizing agents and additional chain extenders to the aqueous dispersion, it may be desirable to add other conventional materials such as thickening agents, pH adjusters, monoisocyanates and the like.

It may be also desirable to add other polyurethane prepolymers made from unmodified polyether polyols or polyester polyols or the like.

Thickening agents may be added to the dispersion to produce coatings and adhesives having an acceptable viscosity. Suitable thickening agents include those conventionally known in the art [See U.S. Pat. No. 3,923,713 (Hermann)] such as methyl cellulose, hydroxyethyl cellulose, polyacrylic emulsions plus alkali, gums and the like.

These dispersions may be blended with other dispersions [See U.S. Pat. No. 4,238,378 (Markusch et al.)]. Furthermore, fillers, plasticizers, pigments, carbon black and silica sols, aluminum clay and asbestos dispersions may be incorporated into these dispersions.

If an organic solvent was employed in the making of the polyurethane prepolymer, it may be distilled off and a portion of it may be replaced with more water.

4. Uses of Aqueous Polyurethane Dispersions

Aqueous polyurethane dispersions of the present invention may be used as coatings and adhesives for fabrics, plastics, wood, metals and the like because of their advantageous properties such as their good chemical resistance, abrasion-resistance, toughness, elasticity, durability, and their ability to completely dry rapidly. Specific uses as coatings and adhesives include metal pipe coatings, paints, varnishes, label adhesives, decals and the like.

The following examples are given to further illustrate the present invention. All parts and percentages are by weight unless otherwise explicitly noted.

PREPARATION OF CARBOXYLIC ACID-CONTAINING POLYETHER POLYOL ADDITION PRODUCT WITH MALEIC ACID

Example 1

A 3-neck flask was charged with maleic acid (MA) (36.1 grams) and polyether polyol (463.9 grams) made by reacting propylene oxide with propylene glycol initiator (see Polyol C in Table I). The mixture was heated to 80° C. under nitrogen with stirring, until the acid was dissolved. A free radical initiator, 2,5-dimethyl-2,5-bis(2-ethyl hexanoyl peroxy) hexane (7.5 grams) was added and the mixture was heated to 100° C. under nitrogen. After one hour, more free radical initiator (7.5 grams) was added. An IR analysis was run periodically (e.g. about every hour) throughout the experiment. This analysis showed a disappearance of the maleic acid double bond at 1650 $CM^{-1}$ in the IR spectrum for the reaction mixture. The reaction was complete approximately 2 hours at 100° C. after the last addition of the free radical initiator.

The amber liquid product was cooled to room temperature and used to make polyurethane prepolymers without any purification. The IR analysis of this carboxylic acid-containing polyether polyol product show no double bond at 1650 $CM^{-1}$ and a small peak at 1800 $CM^{-1}$. This latter peak indicated a small amount of an ester formation occurred. This ester formation was a side reaction of an OH group in the polyol with a carboxyl group in the acid.

The percentage of ester formed was determined by titrating a sample of the product with a base (i.e. KOH or NaOH). At a known sample weight, the measured amount of base needed to neutralize the sample indicated the amount of maleic acid converted to ester during the reaction.

See Table II, Example 1 for the percentage of ester formation for this reaction. As shown there, 25% by weight of maleic acid formed the ester by-product and 75% by weight of the maleic acid reacted with the polyol to form the desired free radical addition product. It should be noted that the ester formed by the carboxylic acid and the polyol may still be capable of free-radical addition onto another polyol molecule. Thus, there may be some cross-linking in these products via ester linkages.

PREPARATION OF CARBOXYLIC ACID-CONTAINING POLYETHER POLYOL ADDITION PRODUCT WITH FUMARIC ACID

Example 2

A 3-neck flask was charged with fumaric acid (FA) (20.4 grams) and a mixture of two polyether polyols. One polyol (178 grams) was the same one used in Example 1 (Polyol C in Table I). The second polyol (27.3 grams) was tripropylene glycol (Polyol A in Table I). After addition, the mixture was heated to 90° C. under nitrogen and the same free radical initiator as in Example 1 was added in amounts from 0.5 to 2 gram portions about every 15-30 minutes for a total of 5.9 grams. In contrast to maleic acid, the fumaric acid did not dissolve in the polyol mixture. However, it dissolved as it reacted. After approximately 90 minutes after addition of first portion of the free radical initiator, the reaction was complete as shown by an IR analysis. The amount of ester formation is shown in Table II.

It should be noted that the use of fumaric acid instead of maleic acid reduces the amount of ester formation. This was believed to happen because fumaric acid did not dissolve before reacting.

Examples 3-28

The reactions of Examples 1 and 2 were repeated using different polyether polyols, or with different free radical initiators, or under different conditions. The different polyether polyols used in these examples are listed in the following Table I (Polyols A to N). The different free radical initiators are listed in the following Table IA (Initiators AA-EE).

Table I gives some of the important characteristics of each polyol employed. For example, the EO:PO mole ratio for each polyol is given. The polyols are all EO, all PO, or are block or random copolymers of EO and PO. The initiator reacts with the oxide or oxides to form the polyol. The functionality of the polyol is the number of reactive OH groups in the molecule. The molecular weight (MW) is total average weight of each polyol.

Table IA also shows the tradename and a supplier of each free radical initiator used.

Table II shows the types of polyol, acid, peroxide free radical initiator, solvent, reaction temperature, reaction time and % ester by-product in the product for each example. The weight percent of polyol and acid indicated is based on the total weight of combined polyol and acid added. The weight % of the peroxide added is based on the total weight of the polyol and acid (not including the weight of the peroxide).

Note Examples 26-28 employed $H_2O$ as a solvent. The weight % of water is based on total polyol, acid, and peroxide weight employed. Water as a solvent dissolves the high molecular weight polyols for ease of reaction.

Please note that Examples 3, 11 and 15-28 did not measure ester formation by base titration.

TABLE I

| | | POLYETHER POLYOLS | | | |
|---|---|---|---|---|---|
| POLYOL | TRADENAME[1] | EO:PO MOLE RATIO[2] | INITIATOR | FUNCTIONALITY | MW |
| A | TPG | 0:100 | Propylene Glycol | 2 | 192 |
| B | DPG | 0:100 | Propylene Glycol | 2 | 106 |
| C | PG 20-265 | 0:100 | Propylene Glycol | 2 | 425 |
| D | PG 30-280 | 0:100 | Glycerin | 3 | 600 |
| E | PG 20-112 | 0:100 | Propylene Glycol | 2 | 1000 |
| F | PG 20-56 | 0:100 | Propylene Glycol | 2 | 2000 |
| G | PG 32-56 | 5:95 R | Glycerin | 3 | 3000 |
| H | PG 32-52 | 10:90 R | Glycerin | 3 | 3250 |
| I | Carbowax 600 | 100:0 | Ethylene Glycol | 2 | 600 |
| J | PG 85-29-2 | 15:85 B | Glycerin | 3 | 6400 |
| K | PG WT-9150 | 75:25 R | Ethylene Glycol | 2 | 6200 |
| L | PG WT-90,000 | 75:25 R | Ethylene Glycol | 2 | 12,500 |
| M | 75H-380,000 | 75:25 R | Ethylene Glycol | 2 | 35,000 |
| N | SL-62 | 73:27 B | $C_6$-$C_{10}$ Alcohol Mixture | 1 | 700 |

[1]All polyols are manufactured by Olin Corporation, Stamford, Connecticut except Polyols I and M (Carbowax 600) and 75H-380,000 which are manufactured by Union Carbide Corporation of Danbury, Connecticut. The designation PG used in this column stands for Olin's trademark POLY-G ®.
[2]R stands for random; B stands for block.

TABLE IA
FREE RADICAL INITIATORS

| TYPE | CHEMICAL NAME | TRADEMARK NAME AND SUPPLIER |
|---|---|---|
| AA | 2,5-Dimethyl-2,5-bis (2-ethylhexanoyl peroxy)hexane | USP-245 (Witco Corporation) |
| BB | 1,1-Bis(t-butyl peroxy)cyclohexane | USP-400P (Witco Corporation) |
| CC | t-Butyl peroxy neodecanoate | Lupersol 10M75 (Pennwalt Corporation) |
| DD | Acetyl cyclohexylsulfonyl peroxide | Lucidol 228Z (Pennwalt Corporation) |
| EE | t-Butyl perbenzoate | |

TABLE II
Carboxylic Acid-Containing PolyetherPolyols

| Example No. | Polyol Type | Polyol Wt. % | Acid Type | Acid Wt. % | Peroxide Type | Peroxide Wt. % | Solvent Name | Solvent Wt. % | Reaction Temp (°C.) | Reaction Time (hrs.) | Ester Wt % |
|---|---|---|---|---|---|---|---|---|---|---|---|
| 1 | C | 92.7 | MA | 7.3 | AA | 1.5 | — | — | 100 | 3.0 | 25 |
| 2 | C/A | 79/12 | FA | 9 | AA | 2.6 | — | — | 90 | 1.5 | 4 |
| 3 | C | 90 | MA | 10 | AA | 4 | — | — | 95 | 4 | N.M.(b) |
| 4 | C | 92.7 | FA | 7.3 | AA | 2 | — | — | 95 | 1.5 | 17 |
| 5 | C/B | 73/18 | FA | 9 | AA | 2.5 | — | — | 100 | 1.25 | 3 |
| 6 | A | 92.8 | FA | 7.2 | AA | 2 | — | — | 95 | 1.5 | 0 |
| 7 | C/A | 61.7/28 | FA | 10.3 | AA | 2.1 | — | — | 100 | 1.5 | 5 |
| 8 | C/A | 60/28 | FA | 12 | AA | 3.4 | — | — | 100 | 1.5 | 5 |
| 9 | C/A | 81.5/9.5 | FA | 9 | AA | 2.6 | — | — | 95 | 1.5 | 5 |
| 10 | C/A | 67.6/20 | FA | 11.4 | AA | 2.3 | — | — | 105 | 2.5 | 3 |
| 11 | C/D | 79/11 | MA | 10 | AA | 4 | — | — | 85 | 4 | N.M. |
| 12 | E | 92.8 | FA | 7.2 | AA | 2 | — | — | 105 | 3 | 10 |
| 13 | E | 84.6 | FA | 15.4 | AA | 6 | — | — | 105 | 8 | 20 |
| 14 | F | 92.8 | FA | 7.2 | AA | 2.8 | — | — | 105 | 3, 10 | |
| 15 | G | 90 | FA | 10 | BB | 6 | — | — | 110 | 1.5 | N.M. |
| 16 | H | 96 | FA | 4 | AA | 0.8 | — | — | 105 | 8 | N.M. |
| 17 | C | 92.8 | MA | 7.2 | CC | 6.6 | — | — | 66 | 2.5 | N.M. |
| 18 | C | 92.8 | MA | 7.2 | DD | 6.6 | — | — | 60 | 2.5 | N.M. |
| 19 | J | 91.7 | FA | 8.3 | AA | 14 | — | — | 105 | 8 | N.M. |
| 20 | V | 96.2 | FA | 3.8 | AA | 0.5 | — | — | 105 | 3 | N.M. |
| 21 | I | 75 | FA | 25 | BB | 15 | — | — | 110 | 8 | N.M. |
| 22 | N | 77.7 | FA | 22.3 | BB | 10 | — | — | 120 | 24 | N.M. |
| 23 | N | 60 | FA | 40 | BB | 10 | — | — | 120 | 24 | N.M. |
| 24 | K | 93 | FA | 7 | BB | 2 | — | — | 95 | 1.5 | N.M. |
| 25 | K | 93 | FA | 7 | EE | 2 | — | — | 113 | 1.5 | N.M. |
| 26 | K | 93 | FA | 7 | BB | 2 | $H_2O$ | 50 | 95 | 16 | N.M. |
| 27 | L | 96.4 | FA | 3.6 | BB | 2 | $H_2O$ | 50 | 95 | 16 | N.M. |
| 28 | M | 89.8 | FA | 11.1 | BB | 2 | $H_2O$ | 50 | 95 | 16 | N.M. |

(a)To obtain 85–95% yield based on IR.
(b)N.M. = not measured

PREPARATION OF POLYURETHANE PREPOLYMERS FROM CARBOXYLIC ACID-CONTAINING POLYETHER POLYOL ADDITION PRODUCTS

Example 29

A 3-neck flask was charged with dicyclohexylmethane-4,4'-diisocyanate[1] (52.2 grams); the carboxylic acid-containing polyether polyol addition product made in Example 1 (6.8 grams); methyl ethyl ketone (30.0 grams); and dibutyltin dilaurate (0.75 grams) in that order and mixed by stirring. The mixture was then heated to 55° C. under nitrogen while stirring. The reaction temperature rose to 85° C. within 15 minutes because of an exotherm. The mixture was then heated at that temperature for about four hours to form a polyurethane prepolymer with a theoretical free NCO content of 3.0% by weight based on the isocyanate, polyol and solvent charged and a NCO:OH ratio of 1.4:1.

[1]Desmodur W. made by Mobay Corporation of Pittsburg, PA.

This polyurethane prepolymer/catalyst/solvent mixture was employed in aqueous dispersions starting with Example 45.

Examples 30-42

The reaction of Example 29 was repeated except different carboxylic acid-containing polyether polyols were used. The carboxylic acid-containing polyether polyol, amounts of ingredients, theoretical free NCO and NCO:OH ratio for these examples are given in Table III. The amount of catalyst added was always 0.5% by weight based on the carboxyl-containing polyether polyol, isocyanate and methyl ethyl ketone solvent. The amount of solvent added was always 20% by weight of the total mixture [polyol, isocyanate, solvent], but not including the catalyst weight.

TABLE III
POLYURETHANE PREPOLYMERS

| Examples | Carboxylic Acid-Containing Polyether Polyol Example No. | Wt. of Polyol Added | Free NCO Theoretical Wt. % | NCO Actual Wt. % | NCO:OH Ratio |
|---|---|---|---|---|---|
| 29 | 1 | 500 | 3.0 | NM | 1.4:1 |
| 30 | 3 | 265 | 4.5 | 2.7 | 1.7:1 |
| 31 | 4 | 250 | 2.0 | NM | 1.23:1 |
| 32 | 7 | 290 | 3.2 | NM | 1.33:1 |
| 33 | 8 | 146 | 3.2 | NM | 1.33:1 |
| 34 | 9 | 218 | 2.4 | NM | 1.21:1 |
| 35 | 2 | 225 | 2.6 | NM | 1.31:1 |
| 36 | 8 | 294 | 2.2 | NM | 1.22:1 |
| 37 | 10 | 262 | 1.0 | NM | 1:1 |
| 38 | 11 | 108 | 4.5 | 1.8 | 1.6:1 |
| 39 | 12 | 464 | 2.0 | 0.83 | 1.43:1 |
| 40 | 12 | 464 | 2.0 | 0.89 | 1.43:1 |
| 41 | 14 | 232 | 2.0 | 0.88 | 1.79:1 |
| 42 | 14 | 232 | 1.5 | 0.63 | 1.57:1 |

Example 43

A 3-neck flask was charged with the carboxylic acid-containing polyether polyol of Example 3 (45 grams) and dipropyleneglycol (Polyol B from Table I) (1.25 grams). Then, the flask was charged with methyl ethyl ketone (23 grams), dicyclohexylmethane-4,4'-diisocyanate[1] (40 grams) and dibutyltin dilaurate (0.6 grams). This mixture was reacted at 85° C. under nitrogen while stirring for 75 minutes. The theoretical free NCO% was 4, but the actual free NCO% was found to be 2 by titration. The reduction of the free NCO was believed to be the result of a side-reaction with the carboxylic groups to give an amide and generate carbon dioxide. The dipropyleneglycol was used to harden the properties of coatings made from this prepolymer. The catalyst/solvent/prepolymer was employed in an aqueous dispersion shown in Ex. 59.

[1] Desmodur W. made by Mobay Corporation of Pittsburgh, PA.

Example 44

A 3-neck flask was charged with the carboxylic acid-containing polyether polyol of Example 3 (50 grams) and Polyol D of Table I (10 grams). Next methyl ethyl ketone (22 grams), toluene diisocyanate (TDI) (29.6 grams) and dibutyltin dilaurate (0.56 grams) were added. This mixture was reacted at 85° C. under nitrogen with stirring for 30 minutes. The theoretical free NCO% was 4%, but the actual free NCO% was found to be 2.3 by titration. The Polyol D was used to harden coatings made from this polyurethane prepolymer.

This prepolymer/catalyst/solvent mixture was employed in an aqueous dispersion in Ex. 60.

PREPARATION OF AQUEOUS POLYURETHANE DISPERSIONS FROM CARBOXYLIC ACID-CONTAINING POLYETHER POLYOL ADDITION PRODUCTS

Examples 45-60

The total hot prepolymer/catalyst/solvent mixtures of Examples 29-44, respectively, were added at a steady rate into water and triethylamine mixtures under vigorous stirring (1,000-2,000 RPM) using an intensive type stirrer of 2" diameter. The stirring continued for about 10 minutes until the prepolymer was completely dispersed. The viscosity of mixture was kept low (i.e. under about 1000 cps) by addition of water, methyl ethyl ketone or isopropanol. The viscosity of mixtures were either low (under about 1000 cps), medium (from about 1000 to about 2000 cps) or high (about 2000 cps) and the mixtures contained about 30% to 40% solids. The amount of triethylamine added was equivalent to the amount of theoretical carboxylic acid groups in the polyether polyol.

The dispersed polyurethane prepolymer was extended with ethylene diamine (EDA) after this intensive stirring. The EDA was added drop-wise until the theoretical amount of free NCO would be reacted. This addition takes about 5 to 10 minutes. If the viscosity during EDA addition increases above 2000 cps, water or methyl ethyl ketone was added to lower it. The dispersions were then stirred for a few minutes and left in closed containers for at least 24 hours. The non-volatiles were calculated. They include everything except water, methyl ethyl ketone and isopropanol.

TABLE IV

| | AQUEOUS POLYURETHANE DISPERSIONS | | | |
|---|---|---|---|---|
| Example | Prepolymer Example | EDA/NCO (Equivalent Ratio) | Non-Volatiles (Wt. %) | Dispersion Viscosity (cps, 25° C.) |
| 45 | 29 | 1.0 | 30 | Low |
| 46 | 30 | 0.5 | 40 | Low |
| 47 | 31 | 1.0 | 32 | Low |
| 48 | 32 | 1.0 | 30 | High |
| 49 | 33 | 1.0 | 30 | Medium |
| 50 | 34 | 1.0 | 33 | Low |
| 51 | 35 | 1.0 | 33 | Low |
| 52 | 36 | 1.0 | 39 | Low |
| 53 | 37 | 1.0 | 34 | Low |
| 54 | 38 | 1.0 | 34 | Low |
| 55 | 39 | 1.0 | 36 | 3920 |
| 56 | 40 | 0.5 | 30.6 | 85.2 |
| 57 | 41 | 1.0 | 32.8 | 6450 |
| 58 | 42 | 1.0 | 39.9 | 2720 |
| 59 | 43 | 1.0 | 30. | — |
| 60 | 44 | 1.0 | 43. | — |

PREPARATION OF COATINGS FROM AQUEOUS POLYURETHANE DISPERSIONS

Examples 61-72

Coating samples were prepared from the dispersions made according to Examples 45-54, 59 and 60. Portions of each dispersion were individually poured onto separate tin plates (about 6 by 12 inches in size). A Gardner drawn-down bar was used to evenly spread out the dispersion over the plate at thicknesses of 20 to 50 mils (wet). These spread out dispersions were then allowed to dry out at room temperature over a period of 2 to 3 days. The rough edges of the dried dispersion were cut off and the dried dispersion (now called a coating sample) was released from the plate by application of elemental mercury to the sides of coating. The mercury works itself underneath the coating and causes the release of the coating. The released coating was stored for at least a week to completely dry. The coating was then tested for coating property, tensile strength, percent elongation and tear strength. The results of this testing are given in Table V.

These results show that the hardness of the coating may be varied by changing the molecular weight of the polyether polyol, the functionality of the polyol or the % free NCO.

TABLE V

| | | COATINGS | | | |
|---|---|---|---|---|---|
| Example No. | Dispersion Example | Coating Property | Tensile Strength Ultimate (psi) | Elongation % | Tear Strength (lb/in) |
| 61 | 45 | Flexible | N.M. | N.M. | N.M. |
| 62 | 46 | Flexible | 1384 | 252 | 114.3 |
| 63 | 47 | Flexible | N.M. | N.M. | N.M. |
| 64 | 48 | Hard & Brittle | N.M. | N.M. | N.M. |
| 65 | 49 | Hard & Brittle | N.M. | N.M. | N.M. |
| 66 | 50 | Semi-Flexible | 939 | 142 | N.M. |
| 67 | 51 | Semi-Flexible | 3165 | 304 | N.M. |
| 68 | 52 | Hard | 2345 | N.M. | N.M. |
| 69 | 53 | Semi-Flexible | 1877 | 277 | N.M. |
| 70 | 54 | Flexible | 2791 | 224 | 78.2 |
| 71 | 59 | Semi-Flexible | 2168 | 349 | 349 |
| 72 | 60 | Semi-Flexible | N.M. | N.M. | N.M. |

PREPARATION OF ADHESIVES FROM AQUEOUS POLYURETHANE DISPERSIONS

Examples 73-76

The aqueous dispersions of Examples 55 to 58 were drawn out and dried using the same procedure as for coatings. Instead of releasing the dried dispersions from the tin plate with mercury, another tin plate was placed on top of the dried dispersion. The top plate adhered to the dispersion. The two tin plates were then tested for tensile strength to pull them apart. This testing comprised (1) cutting one inch squares of the attached plates; (2) then both outer surfaces were glued with epoxy to metal blocks; (3) the metal blocks were pulled apart at a rate of 0.05 inches per minute and (4) the tensile strength required to break apart the tin plates was measured. The average results of three or four samples from each plate are given in Table VI. As can be seen, these adhesives of the present invention are generally stronger than the commercial epoxy employed and work well as adhesives.

TABLE VI
ADHESIVES

| Example No. | Dispersion Example | Average Tensile Strength Ultimate (PSI) |
|---|---|---|
| 73 | 55 | 64.17[a] |
| 74 | 56 | 42.[a] |
| 75 | 57 | 53.12[a] |
| 76 | 58 | 16.4 |

[a] Epoxy glue broke at least once.

What is claimed is:

1. A process for making a carboxylic acid-containing polyurethane prepolymer comprising the steps of:
   (a) reacting at least one polyhydroxy-containing monoether or polyether compound with an ethylenically unsaturated dicarboxylic acid selected from the group consisting of maleic acid, fumaric acid, itaconic acid and mixtures thereof, in the presence of a peroxy-type free-radical initiator to form a carboxylic acid-containing monoether or polyether polyol addition product; said weight ratio of said monoether or polyether compound to said acid being from about 99:1 to about 70:30; and
   (b) reacting said carboxylic acid-containing monoether or polyether polyol with an organic polyisocyanate to form said carboxylic acid-containing polyurethane prepolymer.

2. The process of claim 1 wherein said reaction of step (b) is carried out in the presence of a solvent which is water-miscible and without active hydrogens.

3. The process of claim 1 wherein said organic polyisocyanate is selected from the group consisting of aromatic, cycloaliphatic and aliphatic diisocyanates.

4. The process of claim 1 wherein the molar ratio of NCO to OH groups is from about 0.5:1 to about 5:1.

5. The process of claim 1 wherein said reaction in step (b) is carried out at a temperature from about 25° C. to about 150° C.

6. The process of claim 1 comprising the steps of:
   (a) reacting a polyether polyol selected from the group consisting of polyoxyethylene diols, polyoxyethylene triols, polyoxypropylene diols, polyoxypropylene triols, block and random polyoxyethylenepolyoxypropylene diols and triols, and mixtures thereof and having an average molecular weight from about 300 to about 6,500 with an acid selected from the group consisting of maleic acid, fumaric acid and mixtures thereof in the presence of a peroxy-type free radical initiator at a temperature from about 80° C. to about 130° C. to form a carboxylic acid-containing polyether polyol; said weight ratio of said polyether polyol to said acid being from about 95:5 to about 80:20 and
   (b) reacting said carboxylic acid containing polyether polyol with a diisocyanate in the presence of a solvent which is water miscible and without active hydrogens at a temperature from about 40° C. to about 100° C. to form said carboxylic acid-containing polyurethane prepolymer.

7. A polyurethane prepolymer made according to the process of claim 1.

8. A polyurethane prepolymer made according to the process of claim 6.

9. A process for making an aqueous polyurethane dispersion comprising the steps of:
   (a) reacting at least one polyhydroxy containing monoether or polyether compound with an ethylenically unsaturated dicarboxylic acid selected from the group consisting of maleic acid, fumaric acid, itaconic acid and mixtures thereof in the presence of a peroxytype free-radical initiator to form a carboxylic acid-containing monoether or polyether addition product said weight ratio of said monoether or polyether compound to said acid being from about 99:1 to about 70:30;
   (b) reacting said carboxylic acid-containing monoether or polyether addition product with an organic polyisocyanate to form a carboxylic acid-containing polyurethane prepolymer; and
   (c) forming an aqueous polyurethane dispersion by
      (i) neutralizing the carboxylic groups in said polyurethane prepolymer with a neutralizing agent; and
      (ii) dispersing said polyurethane prepolymer in an aqueous solution.

10. The process of claim 9 wherein said neutralizing agent is selected from the group consisting of a water soluble tertiary amines, alkali metal hydroxides and mixtures thereof.

11. The process of claim 9 wherein said step (c) further comprises (iii) chain-extending said polyurethane prepolymer.

12. The process of claim 9 wherein said neutralizing and said dispersing occur simultaneously at a temperature from about 25° C. to about 75° C.

13. The process of claim 9 comprising the steps of:
   (a) reacting a polyether polyol selected from the group consisting of polyoxyethylene diols, polyoxyethylene triols, polyoxypropylene diols, polyoxypropylene triols, block and random polyoxyethylene-polyoxypropylene diols and triols, and mixtures thereof and having a molecular weight from about 300 to about 6500 with said acid selected from the group consisting of maleic acid, fumaric acid and mixtures thereof in the presence of a peroxy-type free radical initiator at a temperature from about 80° C. to about 130° C. to form a carboxylic acid containing polyether polyol; said weight ratio of said polyether polyol to said acid being from about 95:5 to about 80:20;
   (b) reacting said carboxylic acid-containing polyether with a diisocyanate in the presence of a solvent which is water miscible and without active hydrogens at a temperature from about 25° C. to about 100° C. to form a carboxylic acid-containing polyurethane prepolymer; and (c) forming an aqueous polyurethane dispersion by:
  (i) neutralizing the carboxylic group in said polyurethane prepolymer with a neutralizing agent;
  (ii) dispersing said polyurethane prepolymer in an aqueous solution.
  (iii) chain extending said polyurethane prepolymer.

14. An aqueous polyurethane dispersion made according to the process of claim 9.

15. An aqueous polyurethane dispersion made according to the process of claim 13.

16. The process of applying a coating composition to a substrate wherein said composition comprises an aqueous polyurethane dispersion of claim 14.

17. The process of employing an adhesive composition to at least one substrate wherein said compositio n comprises an aqueous polyurethane dispersion of claim 14.

* * * * *